(12) United States Patent
Cho et al.

(10) Patent No.: US 12,106,286 B2
(45) Date of Patent: Oct. 1, 2024

(54) SYSTEM OF GENERATING, INHERITING AND DESTROYING AVATAR ATTRIBUTE OF REAL-NAME IDENTITY IN METAVERSE AND METHOD THEREOF

(71) Applicants: Inventec (Pudong) Technology Corporation, Shanghai (CN); Inventec Corporation, Taipei (TW); Inventec (Beijing) Electronics Technology Co., LTD, Beijing (CN)

(72) Inventors: Tom-Hwar Cho, Taipei (TW); Li-Cheng Yeh, Taipei (TW); Chuan-Cheng Chiu, Taipei (TW)

(73) Assignees: Inventec Corporation, Taipei (TW); Inventec (Beijing) Electronics Technology Co., LTD, Beijing (CN)

( * ) Notice: Subject to any disclaimer, the term of this patent is extended or adjusted under 35 U.S.C. 154(b) by 223 days.

(21) Appl. No.: 17/945,780

(22) Filed: Sep. 15, 2022

(65) Prior Publication Data
US 2024/0070650 A1 Feb. 29, 2024

(30) Foreign Application Priority Data
Aug. 29, 2022 (CN) .......................... 202211038800.3

(51) Int. Cl.
*H04L 9/40* (2022.01)
*G06Q 20/36* (2012.01)
*G06Q 20/38* (2012.01)
*H04L 9/32* (2006.01)

(52) U.S. Cl.
CPC ......... *G06Q 20/363* (2013.01); *G06Q 20/389* (2013.01); *H04L 9/3236* (2013.01); *H04L 63/08* (2013.01); *G06Q 2220/10* (2013.01)

(58) Field of Classification Search
CPC ..... H04L 63/08; H04L 9/3236; H04L 9/3239; H04L 9/50; G06Q 20/363; G06Q 20/389
See application file for complete search history.

(56) References Cited

U.S. PATENT DOCUMENTS

2024/0070653 A1* 2/2024 Cho .................... G06Q 20/3674

\* cited by examiner

*Primary Examiner* — Minh Dinh
(74) *Attorney, Agent, or Firm* — David R. Stevens; Stevens Law Group

(57) ABSTRACT

A system of generating, inheriting and destroying avatar attribute of real-name identity in metaverse and a method thereof are disclosed. In the system, a fungible token with an avatar attribute is generated, and the fungible token and real-name identity information are bound through the avatar attribute, so that the fungible token can represent the valid avatar in the metaverse; when the user triggers an event, one of operations of splitting, inheriting and destroying the fungible token can be selected based on the triggered event, so as to achieve the technical effect of improving the availability of real-name identity in the metaverse.

10 Claims, 4 Drawing Sheets

SYSTEM OF GENERATING, INHERITING AND DESTROYING AVATAR ATTRIBUTE OF REAL-NAME IDENTITY IN METAVERSE AND METHOD THEREOF

CROSS-REFERENCE TO RELATED APPLICATION

This application claims the benefit of Chinese Application Serial No 202211038800.3, filed Aug. 29, 2022, which is hereby incorporated herein by reference in its entirety.

BACKGROUND OF THE INVENTION

1. Field of the Invention

The present invention relates to a system of generating, inheriting and destroying an avatar attribute and a method thereof, and more particularly to a system of generating, inheriting and destroying avatar attribute of real-name identity in metaverse and a method thereof.

2. Description of the Related Art

In recent years, with the popularization and vigorous development of metaverse technology, various applications based on metaverse have sprung up, and how to improve the availability of the real-name identity in metaverse has become one of the problems that manufacturers are eager to solve.

In general, the conventional metaverse is a non-real-name anonymous world; in order to avoid metaverse becoming an extrajudicial place or to meet the requirement of authenticating the identity of user, the development of the real-name identity has become a matter of course. The conventional real-name identity is implemented with an account password, but the account password is easily used fraudulently when the account password is leaked, and it causes that the identity may be used fraudulently when the password is leaked. Therefore, there is a problem of poor availability of the real-name identity in metaverse.

According to above-mentioned contents, what is needed is to develop an improved technical solution to solve the conventional technology problem of poor availability of real-name identity in metaverse.

SUMMARY OF THE INVENTION

An objective of the present invention is to disclose a system of generating, inheriting and destroying avatar attribute of real-name identity in metaverse and a method thereof, so as to solve the conventional problems.

In order to achieve the objective, the present invention discloses a system of generating, inheriting and destroying avatar attribute of real-name identity in metaverse, wherein the system is applied in environment where a metaverse and a blockchain are integrated together, and the system includes a generating module, a binding module, an executing module, and an authenticating module. The generating module is configured to generate a fungible token in the blockchain in initial, wherein the fungible token has an avatar attribute, and the fungible token is controlled by a cryptocurrency wallet owned by a user. The binding module is connected to the generating module, and configured to receive real-name identity information of the user and bind the real-name identity information with the fungible token, so that the fungible token represents a valid avatar in the metaverse. The executing module is connected to the binding module, wherein when the user triggers one of different events in the metaverse, the executing module selects one of operations of splitting, inheriting and destroying the fungible token based on the triggered one of different events, and the cryptocurrency wallet controls the fungible token based on a selection result, wherein when the operation of splitting the fungible token is executed, a quantity of the fungible token is increased based on a preset ratio, wherein when the operation of inheriting the fungible token is executed, the fungible token is transmitted to the cryptocurrency wallet of an heir, wherein when the operation of destroying the fungible token is executed, the fungible token is transmitted to an eater address. The authenticating module is connected to the executing module, wherein when the quantity of the fungible token is increased to N and the N fungible tokens have the same avatar attributes, the authenticating module permits the N fungible tokens to be provided to the different events for identity authentication, respectively, wherein N is a positive integer.

In order to achieve the objective, the present invention discloses a method of generating, inheriting and destroying avatar attribute of real-name identity in metaverse, the method is applied in network environment where a metaverse and a blockchain are integrated, and the method includes steps of: in initial, generating a fungible token in the blockchain, wherein the fungible token has an avatar attribute, and the fungible token is controlled by a cryptocurrency wallet owned by a user; receiving real-name identity information of the user, and binding the real-name identity information with the fungible token, so that the fungible token represents a valid avatar in the metaverse; when the user triggers one of different events in the metaverse, selecting one of operations of splitting, inheriting and destroying the fungible token based on the triggered one of different events, and controlling the fungible token based on a selection result, by the cryptocurrency wallet, wherein when the operation of splitting the fungible token is executed, a quantity of the fungible token is increased based on a preset ratio, wherein when the operation of inheriting the fungible token is executed, the fungible token is transmitted to the cryptocurrency wallet of an heir, wherein when the operation of destroying the fungible token is executed, the fungible token is transmitted to an eater address, wherein when the quantity of the fungible token is increased to N and the N fungible tokens have the same avatar attributes, the N fungible tokens are permitted to be provided to the different events for identity authentication, respectively, wherein N is a positive integer.

According to the above-mentioned system and method of the present invention, the difference between the present invention and conventional technology is that, in the system of the present invention, the fungible token with the avatar attribute is generated, and the fungible token and the real-name identity information are bound through the avatar attribute, so that the fungible token can represent the valid avatar in the metaverse; when the user triggers an event, one of the operations of splitting, inheriting and destroying the fungible token can be selected to execute based on the triggered event, so as to achieve the technical effect of improving the availability of real-name identity in the metaverse.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
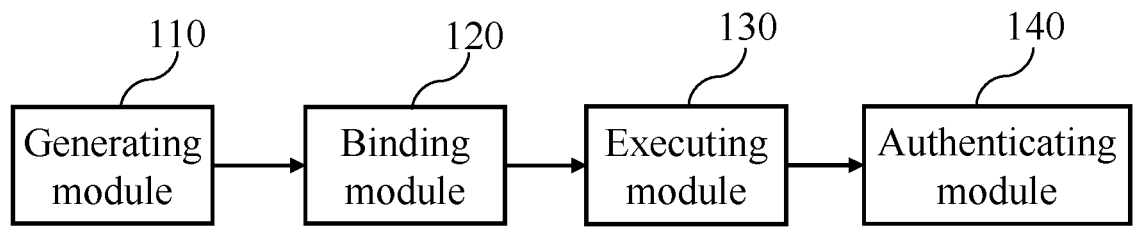
FIG. 1 is a block diagram of a system of generating, inheriting and destroying avatar attribute of real-name identity in metaverse, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIG. 1, which is a block diagram of a system of generating, inheriting and destroying avatar attribute of real-name identity in metaverse, according to the present invention. As shown in FIG. 1, the system is applied in environment where a metaverse and a blockchain are integrated together, and the system includes a generating module 110, a binding module 120, an executing module 130, and an authenticating module 140. The generating module 110 is configured to generate a fungible token in the blockchain in initial; for example, the generating module 110 mints a fungible token based on an ERC20 standard. The fungible token includes an avatar attribute, and the generated fungible token is controlled by a cryptocurrency wallet owned by a user. In actual implementation, the avatar attribute includes a unique identifier; even the fungible token is split into multiple fungible tokens, the unique identifiers contained in the avatar attributes of the multiple fungible tokens are the same as each other because of characteristics of the fungible token.

The binding module 120 is connected to the generating module 110, and configured to receive real-name identity information of the user and bind the real-name identity information with the fungible token, so that the fungible token is able to represent a valid avatar in the metaverse. In actual implementation, when the binding module 120 receives the real-name identity information, the binding module 120 executes a hash function and an encoding function to respectively hash and encode the real-name identity information; for example, the binding module 120 can execute a hash function SHA-256 to hash the real-name identity information, and then execute an encoding function Base64 to encode a hash result to generate a unique identifier contained in the avatar attribute of the fungible token, so as to bind the real-name identity information and the fungible token; in other words, the unique identifier of the avatar attribute is generated based on the real-name identity information, so the fungible token having the avatar attribute can be regarded as being bound with the real-name identity information.

The executing module 130 is connected to the binding module 120; when the user triggers one of different events in the metaverse, the executing module 130 selects one of operations of splitting, inheriting and destroying the fungible token based on the one of different events, and the cryptocurrency wallet controls the fungible token based on a selection result. In an embodiment, when the operation of splitting the fungible token is executed, the quantity of the fungible token is increased based on a preset ratio; when the operation of inheriting the fungible token is executed, the fungible token is transmitted to the cryptocurrency wallet of an heir; when the operation of destroying the fungible token is executed, the fungible token is transmitted to an eater address. In actual implementation, the events can include a splitting event triggered by switching between different metaverses, an inheriting event triggered when the user executes a digital heritage setting in the metaverse, and a destroying event triggered when the user executes an unregistration program in the metaverse. The splitting event is taken as an example for explanation; when the user receives N authentication requests in the metaverse, the executing module 130 treats it as the splitting event, and increases the quantity of the fungible token with a preset ratio 1:N, so that the fungible token is split into N fungible tokens, to facilitate to transmit the fungible tokens to the cryptocurrency wallets of authentication requesters for response to the authentication requests, respectively. In addition, in a condition that the user owns M cryptocurrency wallets in M metaverses, the splitting event is triggered when the user moves or switches to a j-th metaverse from an i-th metaverse, the executing module 130 increases the quantity of the fungible token in the i-th metaverse and transmits the increased fungible token in the i-th metaverse to the cryptocurrency wallet in the j-th metaverse, wherein each of M, i and j is a positive integer.

The authenticating module 140 is connected to the executing module 130; when the quantity of the fungible token is increased to N and the N fungible tokens have the same avatar attributes, the authenticating module 140 permits the fungible tokens to be provided to different events for identity authentication, respectively, wherein N is a positive integer. For example, in a condition that the user triggers 5 identity authentication events, the executing module 130 splits the fungible token to increase the quantity of the fungible token to 5, and the user can transmit the 5 fungible tokens to 5 different identity authentication events, respectively; in other words, providing a fungible token to each event can replace the conventional manner of providing an account password, so that the user's real identity can be authenticated during authentication process according to whether to successfully obtain the fungible token and the avatar attribute. In addition, when the fungible token is provided to the triggered event, the current time information, a network address, and bound real-name identity information in the blockchain can be recorded in real time, for tracking.

It is to be particularly noted that, in actual implementation, the modules of the present invention can be implemented by various manners, including software, hardware or any combination thereof, for example, in an embodiment, the module can be implemented by software and hardware, or one of software and hardware. Furthermore, the present invention can be implemented fully or partly based on hardware, for example, one or more module of the system can be implemented by integrated circuit chip, system on chip (SOC), a complex programmable logic device (CPLD), or a field programmable gate array (FPGA). The concept of the present invention can be implemented by a system, a method and/or a computer program. The computer program can include computer-readable storage medium which records computer readable program instructions, and the processor can execute the computer readable program instructions to implement concepts of the present invention. The computer-readable storage medium can be a tangible apparatus for holding and storing the instructions executable of an instruction executing apparatus Computer-readable storage medium can be, but not limited to electronic storage apparatus, magnetic storage apparatus, optical storage apparatus, electromagnetic storage apparatus, semiconductor storage apparatus, or any appropriate combination thereof. More particularly, the computer-readable storage medium can include a hard disk, an RAM memory, a read-only-memory, a flash memory, an optical disk, a floppy disc or any appropriate combination thereof, but this exemplary list is not an exhaustive list. The computer-readable storage medium is not interpreted as the instantaneous signal such a radio wave or other freely propagating electromagnetic wave, or electromagnetic wave propagated through waveguide, or other transmission medium (such as optical signal transmitted through fiber cable), or electric signal transmitted through electric wire. Furthermore, the computer readable program instruction can be downloaded from the computer-readable storage medium to each calculating/processing apparatus, or downloaded through network, such as internet network, local area network, wide area network and/or wireless network, to external computer equipment or external storage apparatus. The network includes copper transmission cable, fiber transmission, wireless transmission, router, firewall, switch, hub and/or gateway. The network card or network interface of each calculating/processing apparatus can receive the computer readable program instructions from network, and forward the computer readable program instruction to store in computer-readable storage medium of each calculating/processing apparatus. The computer program instructions for executing the operation of the present invention can include source code or object code programmed by assembly language instructions, instruction-set-structure instructions, machine instructions, machine-related instructions, micro instructions, firmware instructions or any combination of one or more programming language. The programming language include object oriented programming language, such as Common Lisp, Python, C++, Objective-C, Smalltalk, Delphi, Java, Swift, C #, Perl, Ruby, and PHP, or regular procedural programming language such as C language or similar programming language. The computer readable program instruction can be fully or partially executed in a computer, or executed as independent software, or partially executed in the client-end computer and partially executed in a remote computer, or fully executed in a remote computer or a server.

Figure 2:
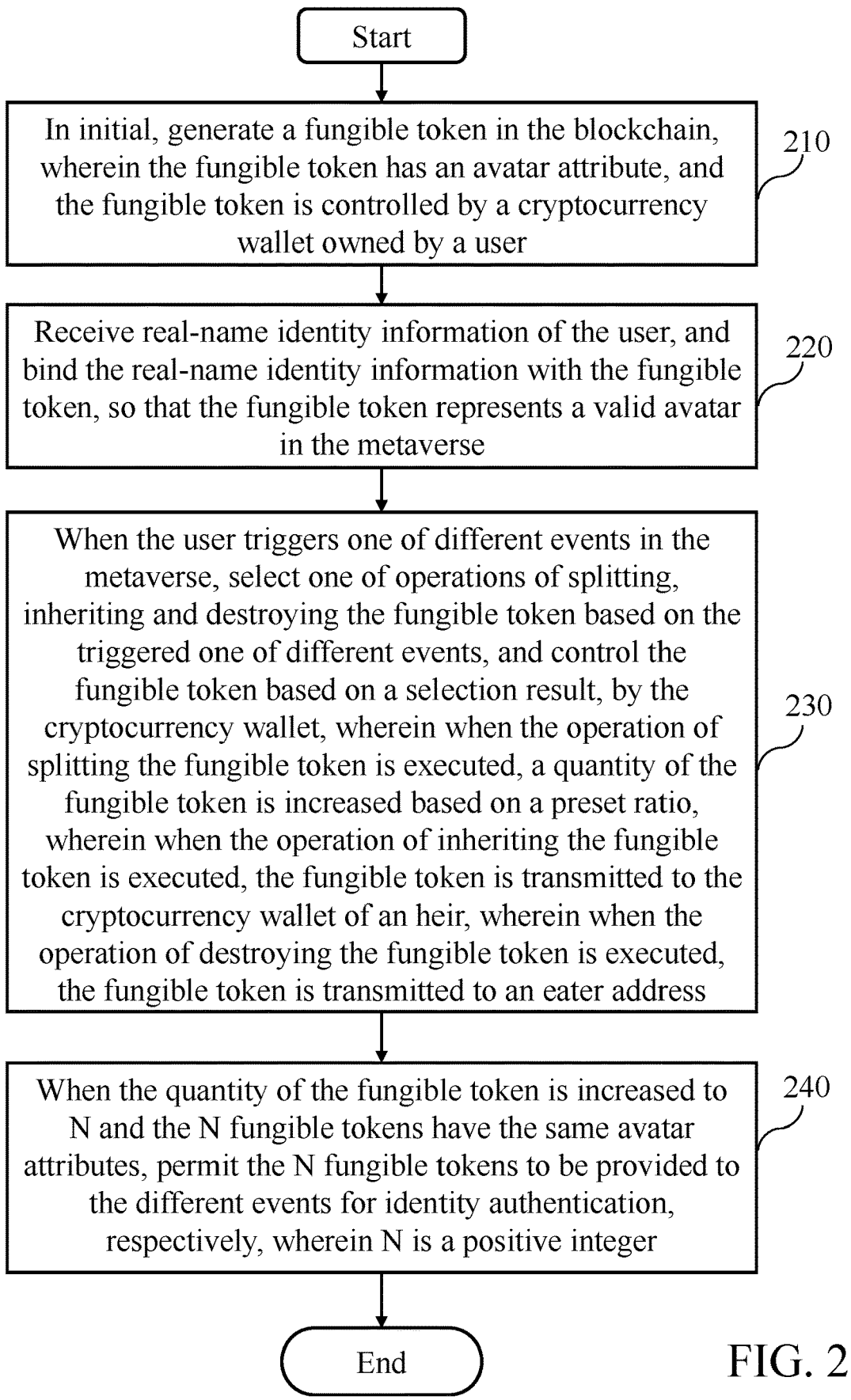
FIG. 2 is a flowchart of a method of generating, inheriting and destroying avatar attribute of real-name identity in metaverse, according to the present invention.

Please refer to FIG. 2, which is a flowchart of a method of generating, inheriting and destroying avatar attribute of real-name identity in metaverse, according to the present invention. As shown in FIG. 2, the method is applied in network environment where a metaverse and a blockchain are integrated, and includes the following steps. In a step 210, in initial, a fungible token is generated in the blockchain, wherein the fungible token has an avatar attribute, and the fungible token is controlled by a cryptocurrency wallet owned by a user. In a step 220, real-name identity information of the user is received, and the real-name identity information is bound with the fungible token, so that the fungible token is able to represents a valid avatar in the metaverse. In a step 230, when the user triggers one of different events in the metaverse, one of operations of splitting, inheriting and destroying the fungible token is selected based on the triggered one of different events, and the fungible token is controlled based on a selection result, by the cryptocurrency wallet, wherein when the operation of splitting the fungible token is executed, a quantity of the fungible token is increased based on a preset ratio, wherein when the operation of inheriting the fungible token is executed, the fungible token is transmitted to the cryptocurrency wallet of an heir, wherein when the operation of destroying the fungible token is executed, the fungible token is transmitted to an eater address. In a step 240, when the quantity of the fungible token is increased to N and the N fungible tokens have the same avatar attributes, the N fungible tokens are permitted to be provided to the different events for identity authentication, respectively, wherein N is a positive integer.

Figure 3:
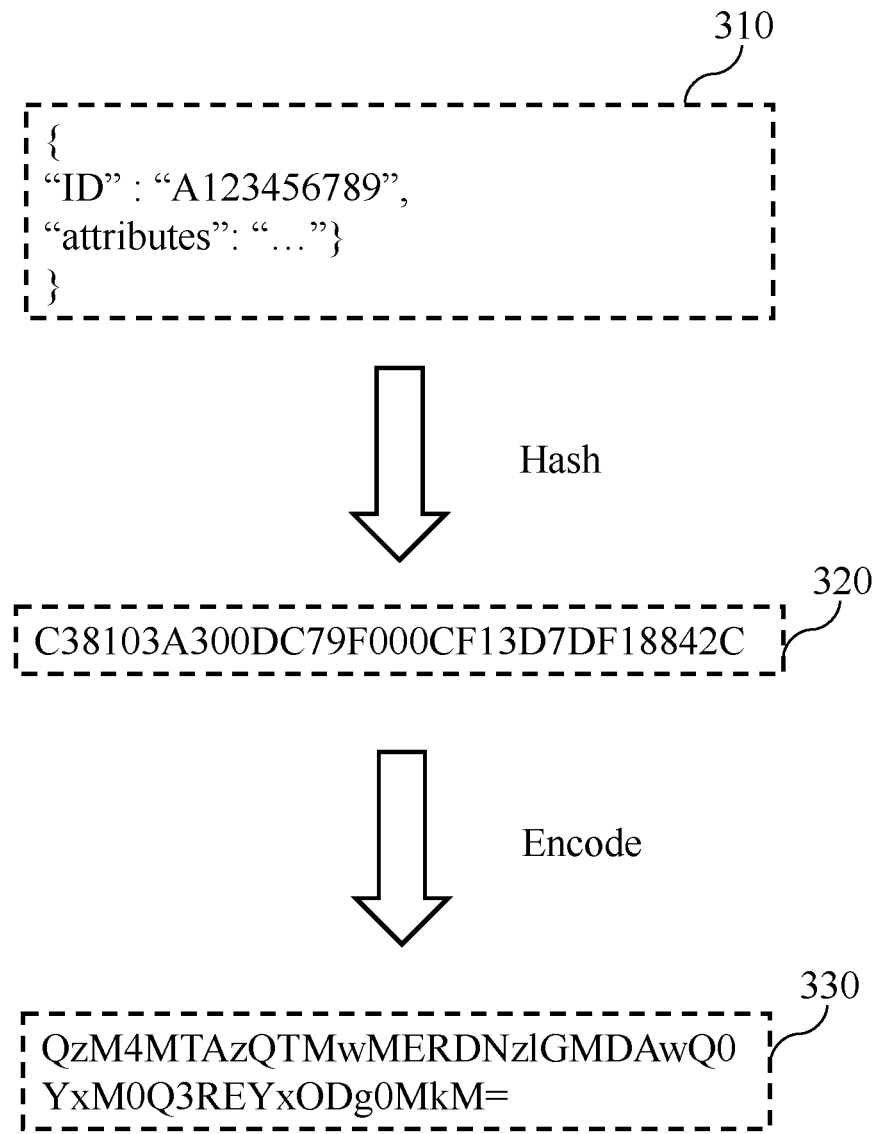
FIG. 3 is a schematic view of an application of binding a fungible token and real-name identity information, according to the present invention.

The embodiment of the present invention will be described in the following paragraphs with reference to FIGS. 3 and 4; FIG. 3 is a schematic view of an application of binding a fungible token and real-name identity information, according to the present invention. In actual implementation, since the fungible token has an avatar attribute, the avatar attribute can have a unique identifier; in order to bind the fungible token and the real-name identity information, the unique identifier to contained in the avatar attribute can be generated based on the real-name identity information, to complete the generation of the avatar attribute. For example, the hash function (such as MD5) can be executed to hash the real-name identity information 310 to obtain the hash result 320; next, the encoding function (such as Base64) is executed to encode the hash result 320 to obtain the unique identifier 330 to be contained in the avatar attribute, so that the fungible token and the real-name identity information are bound. Furthermore, the real-name identity information can be prevented from being leaked because of being recorded in the blockchain in the form of plain text.

Figure 4:
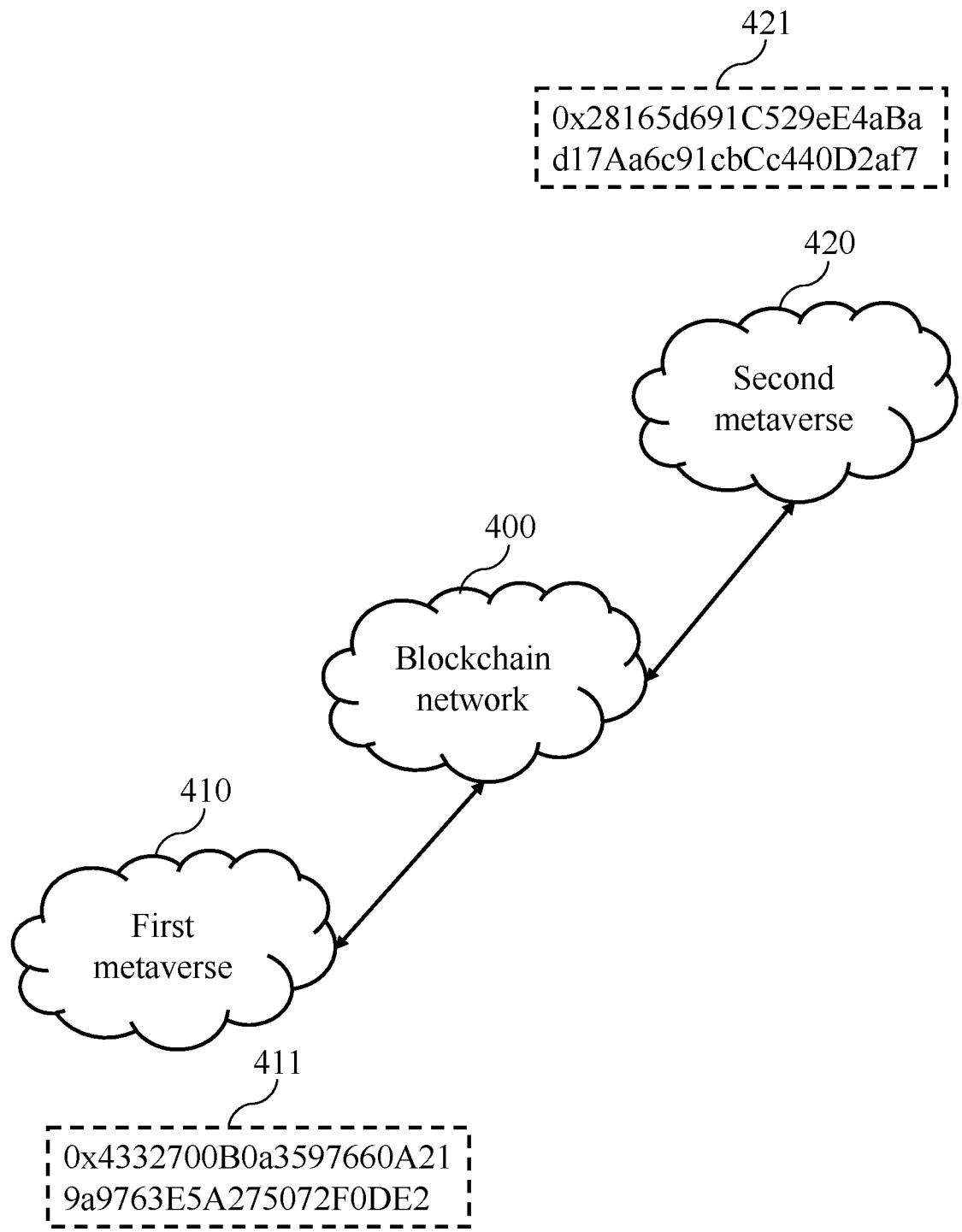
FIG. 4 is a schematic view of an application of controlling a fungible token based on a triggered event, according to the present invention.

As shown in FIG. 4, which is a schematic view of an application of controlling a fungible token based on a triggered event, according to the present invention. In actual implementation, the triggered event can be classified as a splitting event, an inheriting event or a destroying event. The splitting event is an event to split a fungible token into multiple fungible tokens; for example, every time an authentication request is received, the splitting event is triggered, so that the executing module 130 the fungible token by a preset ratio (such as 1:2), to increase the quantity of the fungible token, and the increased fungible token is then transmitted to an authentication requester's cryptocurrency wallet through a blockchain transaction. In this way, the authentication requester authenticates the user's identity based on the avatar attribute of the successfully-received fungible token. For example, in a condition that the authentication requester wants to authenticate whether the real-name identity information of the user is A123456789, the authentication requester can hash and encode the real-name identity information to obtain to-be-authenticated information, and then compare the to-be-authenticated information with the unique identifier contained in the avatar attribute of the fungible token received from the user; when the to-be-authenticated information matches the unique identifier, it indicates that the authentication passes; otherwise, it indicates that the authentication fails. The above-mentioned manner can be applied to the environment where different metaverses exist. the environment where two metaverse (a first metaverse 410 and a second metaverse 420) are integrated with the same blockchain network 400 (such as Ethereum) is taken as example for explanation, the user owns a first cryptocurrency wallet 411 with a wallet address "0x43327..." in the first metaverse 410, and owns a second cryptocurrency wallet 421 with a wallet address "0x28165..." in the second metaverse 420. When the user moves or switches to the second metaverse 420 from the first metaverse 410, the splitting event is triggered, and in this case, the executing module 130 increases the quantity of the fungible token in the first metaverse 410, for example, increases one unit of the fungible token; next, the increased fungible token is transmitted to the second cryptocurrency wallet 421 from the first cryptocurrency wallet 411. In this way, the user can use the fungible token received by the second cryptocurrency wallet 421 as a basis for identity authentication in the second metaverse 420.

In addition, in a condition that the user executes a digital heritage setting in the metaverse, the inheriting event is triggered, the digital heritage setting includes specifying inheritance condition, for example, an inheritance condition can be that the user who has not logged for five years is regarded as user's death, and when this inheritance condition is satisfied, the user's fungible token is transferred to a cryptocurrency wallet of an heir as digital heritage. In this way, when the inheriting event is satisfied, the fungible token is automatically transferred to the cryptocurrency wallet of a preset heir, to complete the inheritance process. Next, when the user executes an unregistration program in the metaverse, the destroying event is triggered, the executing module 130 transmits the user's fungible token to an eater address; in other words, no one can use the fungible token again.

According to above-mentioned contents, the difference between the present invention and the conventional technology is that, in the system of the present invention, the fungible token with the avatar attribute is generated, and the fungible token and the real-name identity information are bound through the avatar attribute, so that the fungible token can represent the valid avatar in the metaverse; when the user triggers an event, one of the operations of splitting, inheriting and destroying the fungible token can be selected to execute based on the triggered event. Therefore, the technical solution of the present invention is able to solve the conventional problem, so as to achieve the technical effect of improving the availability of real-name identity in the metaverse.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A system of generating, inheriting and destroying avatar attribute of real-name identity in metaverse, wherein the system is applied in environment where a metaverse and a blockchain are integrated together, and the system comprises:
   a generating module, configured to generate a fungible token in the blockchain in initial, wherein the fungible token has an avatar attribute, and the fungible token is controlled by a cryptocurrency wallet owned by a user;
   a binding module, connected to the generating module, and configured to receive real-name identity information of the user and bind the real-name identity information with the fungible token, so that the fungible token represents a valid avatar in the metaverse;
   an executing module, connected to the binding module, wherein when the user triggers one of different events in the metaverse, the executing module selects one of operations of splitting, inheriting and destroying the fungible token based on the triggered one of different events, and the cryptocurrency wallet controls the fungible token based on a selection result, wherein when the operation of splitting the fungible token is executed, a quantity of the fungible token is increased based on a preset ratio, wherein when the operation of inheriting the fungible token is executed, the fungible token is transmitted to the cryptocurrency wallet of an heir, wherein when the operation of destroying the fungible token is executed, the fungible token is transmitted to an eater address; and
   an authenticating module, connected to the executing module, wherein when the quantity of the fungible token is increased to N and the N fungible tokens have the same avatar attributes, the authenticating module permits the N fungible tokens to be provided to the different events for identity authentication, respectively, wherein N is a positive integer.

2. The system of generating, inheriting and destroying avatar attribute of real-name identity in metaverse according to claim 1, wherein the avatar attribute has a unique identifier, when the binding module receives the real-name identity information, the binding module executes a hash function and an encoding function to respectively hash and encode the real-name identity information to generate the unique identifier, so as to bind the real-name identity information and the fungible token.

3. The system of generating, inheriting and destroying avatar attribute of real-name identity in metaverse according to claim 1, wherein when the fungible token is provided to the triggered event, current time information, network address and bound real-name identity information are recorded in the blockchain in real time, for tracking.

4. The system of generating, inheriting and destroying avatar attribute of real-name identity in metaverse according to claim 1, wherein the different events comprise a splitting event triggered by switching between different metaverses, an inheriting event triggered when the user executes a digital heritage setting in the metaverse, and a destroying event triggered when the user executes an unregistration program in the metaverse.

5. The system of generating, inheriting and destroying avatar attribute of real-name identity in metaverse according to claim 4, wherein the user owns M cryptocurrency wallets in M metaverses, when the user moves or switches to a j-th metaverse from an i-th metaverse, the splitting event is triggered to increase the quantity of the fungible token in the i-th metaverse, the increased fungible token in the i-th metaverse is transmitted to the cryptocurrency wallet in the j-th metaverse, wherein each of M, i and j is a positive integer.

6. A method of generating, inheriting and destroying avatar attribute of real-name identity in metaverse, the method is applied in network environment where a metaverse and a blockchain are integrated, and the method comprises:
  in initial, generating a fungible token in the blockchain, wherein the fungible token has an avatar attribute, and the fungible token is controlled by a cryptocurrency wallet owned by a user;
  receiving real-name identity information of the user, and binding the real-name identity information with the fungible token, so that the fungible token represents a valid avatar in the metaverse;
  when the user triggers one of different events in the metaverse, selecting one of operations of splitting, inheriting and destroying the fungible token based on the triggered one of different events, and controlling the fungible token based on a selection result, by the cryptocurrency wallet, wherein when the operation of splitting the fungible token is executed, a quantity of the fungible token is increased based on a preset ratio, wherein when the operation of inheriting the fungible token is executed, the fungible token is transmitted to the cryptocurrency wallet of an heir, when the operation of destroying the fungible token is executed, the fungible token is transmitted to an eater address; and
  when the quantity of the fungible token is increased to N and the N fungible tokens have the same avatar attributes, permitting the N fungible tokens to be provided to the different events for identity authentication, respectively, wherein N is a positive integer.

7. The method of generating, inheriting and destroying avatar attribute of real-name identity in metaverse according to claim 6, wherein the avatar attribute has a unique identifier, when the real-name identity information is received, a hash function and an encoding function are executed to respectively hash and encode the real-name identity information to generate the unique identifier, so as to bind the real-name identity information and the fungible token.

8. The method of generating, inheriting and destroying avatar attribute of real-name identity in metaverse according to claim 6, when the fungible token is provided to the event, further comprising:
  recording current time information, network address and bound real-name identity information in the blockchain in real time, for tracking.

9. The method of generating, inheriting and destroying avatar attribute of real-name identity in metaverse according to claim 6, wherein the events comprise a splitting event triggered by switching between different metaverses, an inheriting event triggered when the user executes a digital heritage setting in the metaverse, and a destroying event triggered when the user executes an unregistration program in the metaverse.

10. The method of generating, inheriting and destroying avatar attribute of real-name identity in metaverse according to claim 9, wherein the user owns M cryptocurrency wallets in M metaverses, when the user moves or switches to a j-th metaverse from an i-th metaverse, the splitting event is triggered to increase the quantity of the fungible token in the i-th metaverse, the increased fungible token in the i-th metaverse is transmitted to the cryptocurrency wallet in the j-th metaverse, wherein each of M, i and j is a positive integer.

* * * * *

UNITED STATES PATENT AND TRADEMARK OFFICE
CERTIFICATE OF CORRECTION

PATENT NO. : 12,106,286 B2
APPLICATION NO. : 17/945780
DATED : October 1, 2024
INVENTOR(S) : Tom-Hwar Cho et al.

Page 1 of 1

It is certified that error appears in the above-identified patent and that said Letters Patent is hereby corrected as shown below:

On the Title Page

Item (73) Inventec (Pudong) Technology Corporation, Shanghai (CN) should be listed as the first Assignee.

Signed and Sealed this
Thirteenth Day of May, 2025

Coke Morgan Stewart
*Acting Director of the United States Patent and Trademark Office*